United States Patent
Broadaway et al.

(10) Patent No.: US 10,611,116 B2
(45) Date of Patent: *Apr. 7, 2020

(54) NONWOVEN COMPOSITE

(71) Applicant: Milliken & Company, Spartanburg, SC (US)

(72) Inventors: Sara A. Broadaway, Simpsonville, SC (US); Ryan W. Johnson, Moore, SC (US); Randolph S. Kohlman, Boiling Springs, SC (US); Patrick A. Petri, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/982,020

(22) Filed: May 17, 2018

(65) Prior Publication Data

US 2019/0351643 A1 Nov. 21, 2019

(51) Int. Cl.
*B32B 3/26* (2006.01)
*B32B 5/12* (2006.01)
(Continued)

(52) U.S. Cl.
CPC ............... *B32B 3/26* (2013.01); *B32B 5/12* (2013.01); *B32B 5/18* (2013.01); *B32B 17/04* (2013.01);
(Continued)

(58) Field of Classification Search
CPC B32B 27/12; B32B 5/26; B32B 5/022; B32B 3/26; D04H 1/62
See application file for complete search history.

(56) References Cited

U.S. PATENT DOCUMENTS

| 4,084,033 A | 4/1978 | Drelich ..................... 428/198 |
| 5,019,194 A * | 5/1991 | Friedrich ............ D06N 7/0081 |
| | | 156/61 |

(Continued)

FOREIGN PATENT DOCUMENTS

EP 3 015 583 5/2016

OTHER PUBLICATIONS

Patent Cooperation Treaty PCT International Search Report, dated Dec. 8, 2017. International Application No. PCT/US2017/052683. International Filing Date: Sep. 12, 2017.
(Continued)

*Primary Examiner* — Hai Vo
(74) *Attorney, Agent, or Firm* — Cheryl J. Brickey

(57) ABSTRACT

The application relates to a nonwoven composite containing a plurality of solid regions and a plurality of porous regions. The solid and porous regions form a repeating pattern on the surface of the composite. The solid regions contain a solid region nonwoven layer, an optional solid region polymer-fiber infused layer, and a solid region cap layer. The solid region nonwoven layer contains a plurality of first staple fibers and less than about 5% by volume of a first polymer. The solid region cap layer contains the first polymer and less than about 5% by volume of the first staple fibers. The porous regions contain a porous region nonwoven layer and a porous region polymer-fiber infused layer. The porous region nonwoven layer contains a plurality of the first staple fibers and less than about 5% by volume of a first polymer. The porous region polymer-fiber infused layer contains a plurality of pores.

8 Claims, 6 Drawing Sheets

(51) Int. Cl.
  *B32B 5/18* (2006.01)
  *B32B 17/04* (2006.01)
  *B32B 27/18* (2006.01)
  *B32B 33/00* (2006.01)
  *B32B 38/00* (2006.01)

(52) U.S. Cl.
  CPC .............. *B32B 27/18* (2013.01); *B32B 33/00* (2013.01); *B32B 38/004* (2013.01); *B32B 2305/026* (2013.01); *B32B 2305/22* (2013.01); *B32B 2307/3065* (2013.01); *B32B 2307/73* (2013.01); *B32B 2367/00* (2013.01)

(56) References Cited

U.S. PATENT DOCUMENTS

| | | | |
|---|---|---|---|
| 5,216,790 A | 6/1993 | Eschenback | 28/112 |
| 6,617,002 B2 | 9/2003 | Wood | 428/131 |
| 6,676,199 B2 | 1/2004 | Buisson et al. | 296/193.07 |
| 7,157,137 B2 | 1/2007 | Wenstrup | 428/218 |
| 7,341,963 B2 | 3/2008 | Wenstrup | 442/415 |
| 7,393,371 B2 | 7/2008 | O'Gary et al. | 51/297 |
| 7,428,803 B2 | 9/2008 | Wenstrup et al. | 52/506.07 |
| 7,491,438 B2 | 2/2009 | Demott et al. | 428/95 |
| 7,521,386 B2 | 4/2009 | Wenstrup et al. | 442/389 |
| 7,563,498 B2 | 7/2009 | Shimizuet al. | 428/95 |
| 7,690,480 B2 | 4/2010 | Mori et al. | 181/290 |
| 7,696,112 B2 | 4/2010 | Wenstrup et al. | 442/415 |
| 7,700,176 B2 | 4/2010 | Allison et al. | 428/95 |
| 7,709,405 B2 | 5/2010 | Wenstrup | 442/415 |
| 7,846,282 B2 | 12/2010 | Nishio et al. | 156/78 |
| 7,998,890 B2 | 8/2011 | Flack | 442/411 |
| 8,091,684 B2 | 1/2012 | Juriga | 181/286 |
| 8,322,487 B1 | 12/2012 | Kitchen et al. | 181/294 |
| 8,418,806 B1 | 4/2013 | Wyerman et al. | 181/290 |
| 8,496,088 B2 | 7/2013 | Kitchen et al. | 181/290 |
| 9,005,733 B2 | 4/2015 | Fereshtehkhou et al. | 428/141 |
| 2002/0117352 A1 | 8/2002 | Veen et al. | 181/292 |
| 2005/0064779 A1 | 3/2005 | Allison et al. | 442/181 |
| 2009/0186724 A1* | 7/2009 | Ashida | A63B 41/08 473/607 |
| 2011/0223388 A1 | 9/2011 | Stone et al. | 428/172 |
| 2014/0272209 A1 | 9/2014 | Baker et al. | 428/34.1 |
| 2018/0151167 A1* | 5/2018 | Arvidson | B32B 3/263 |

OTHER PUBLICATIONS

Patent Cooperation Treaty PCT International Search Report, dated Dec. 12, 2017. International Application No. PCT/US2017/051725. International Filing Date: Sep. 15, 2017.

Patent Cooperation Treaty PCT International Search Report, dated Jun. 27, 2019. International Application No. PCT/US2019/025789. International Filing Date: Apr. 4, 2019.

\* cited by examiner

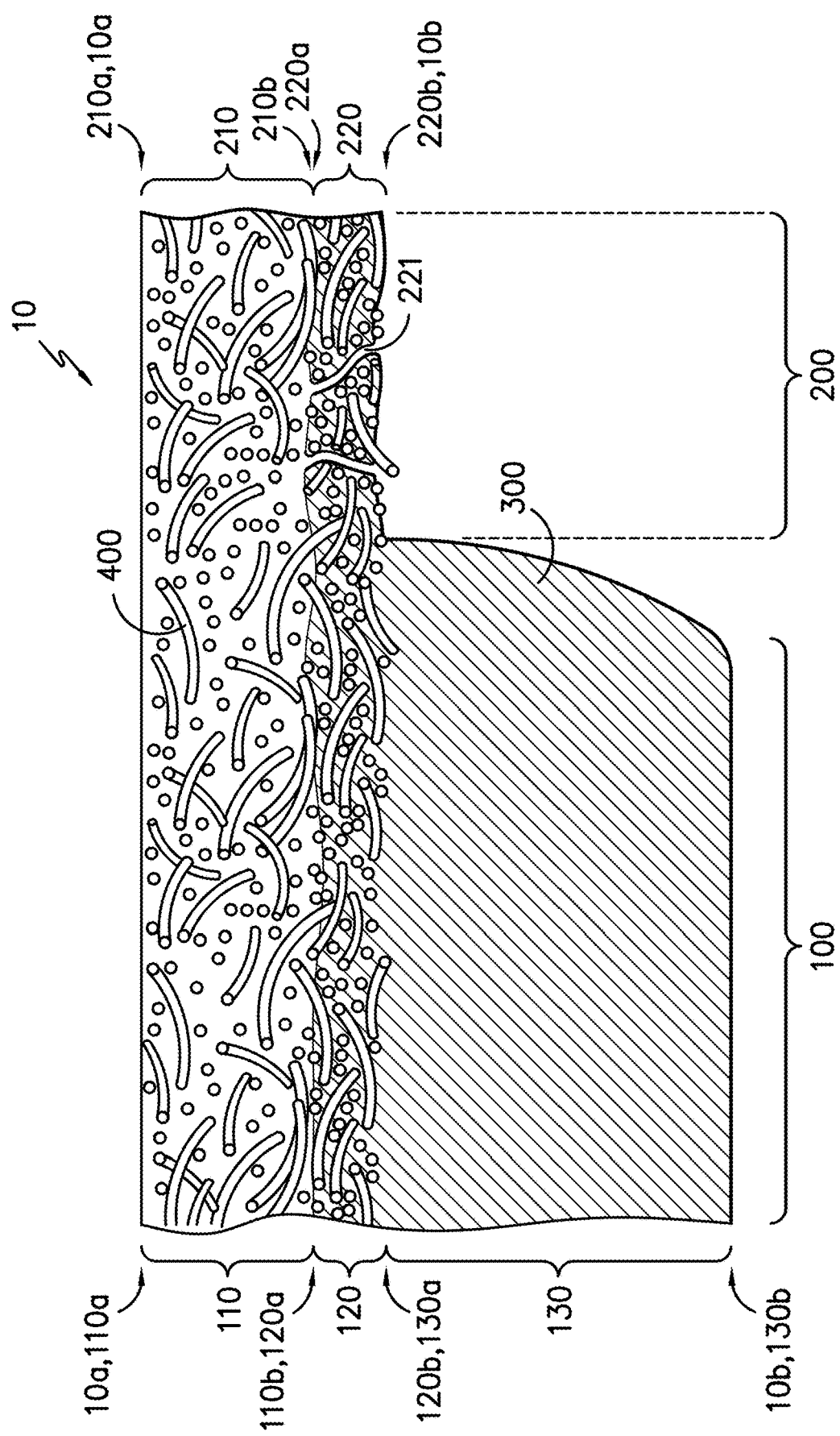
FIG. -1-

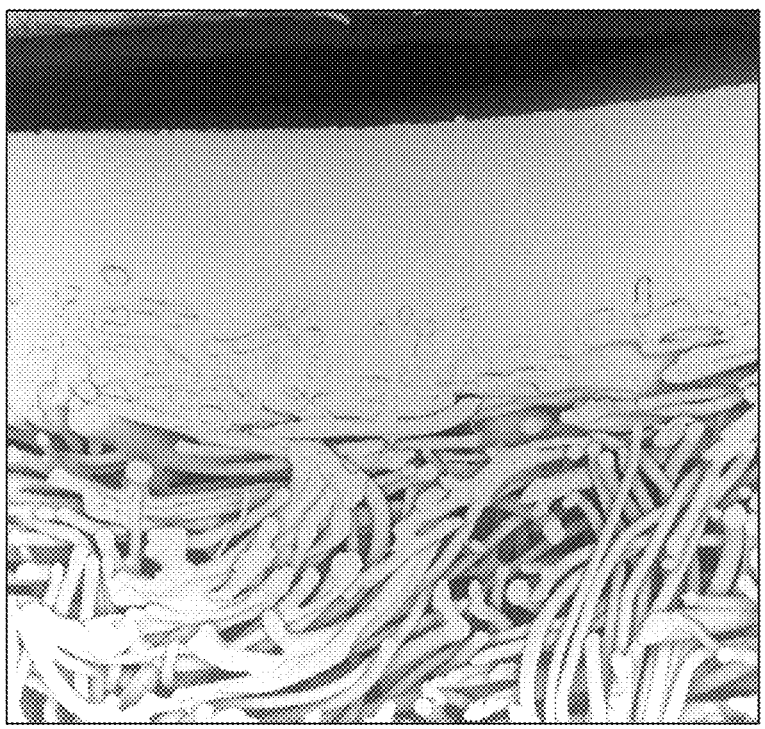
FIG. -2-
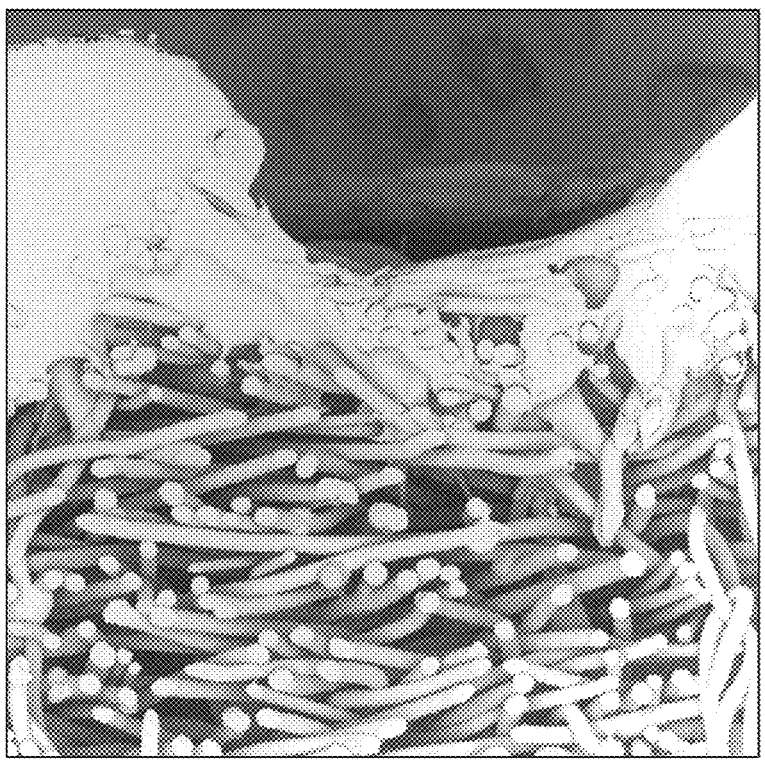
FIG. -3-

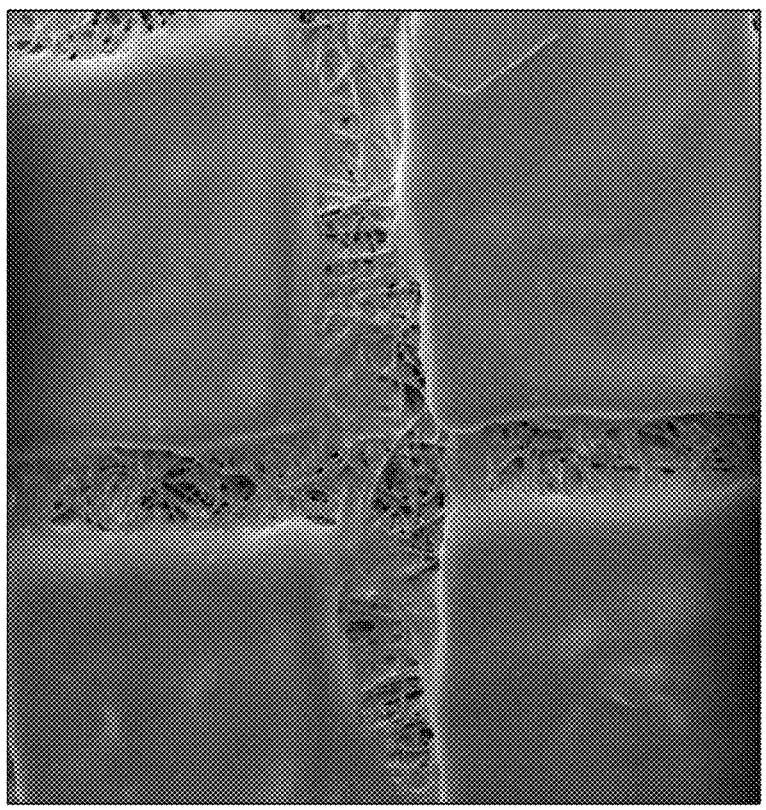
FIG. -4-
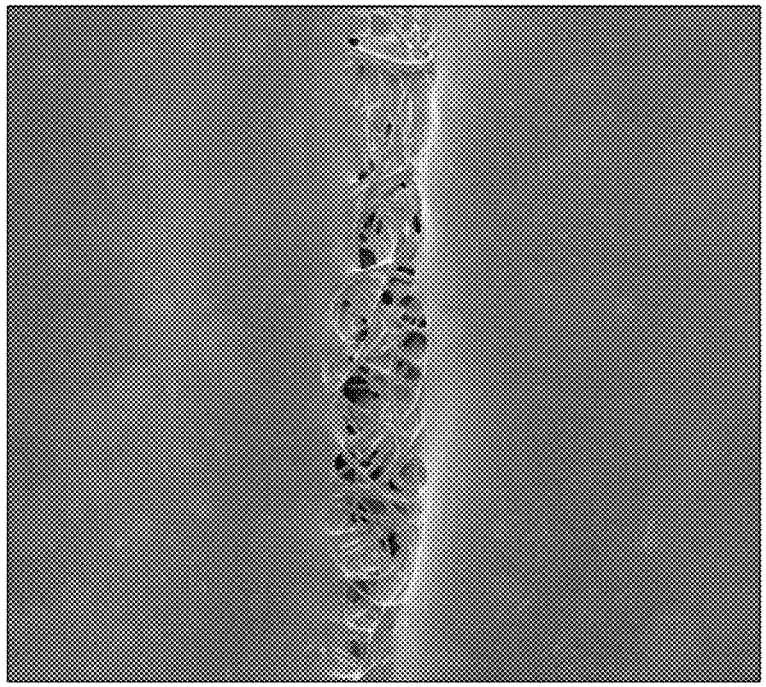
FIG. -5-

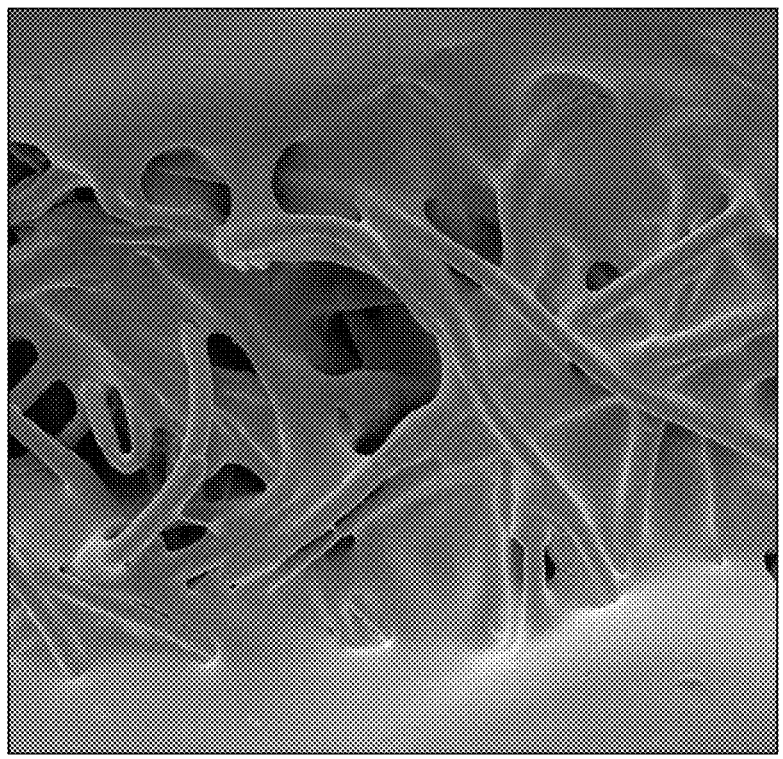
FIG. -6-

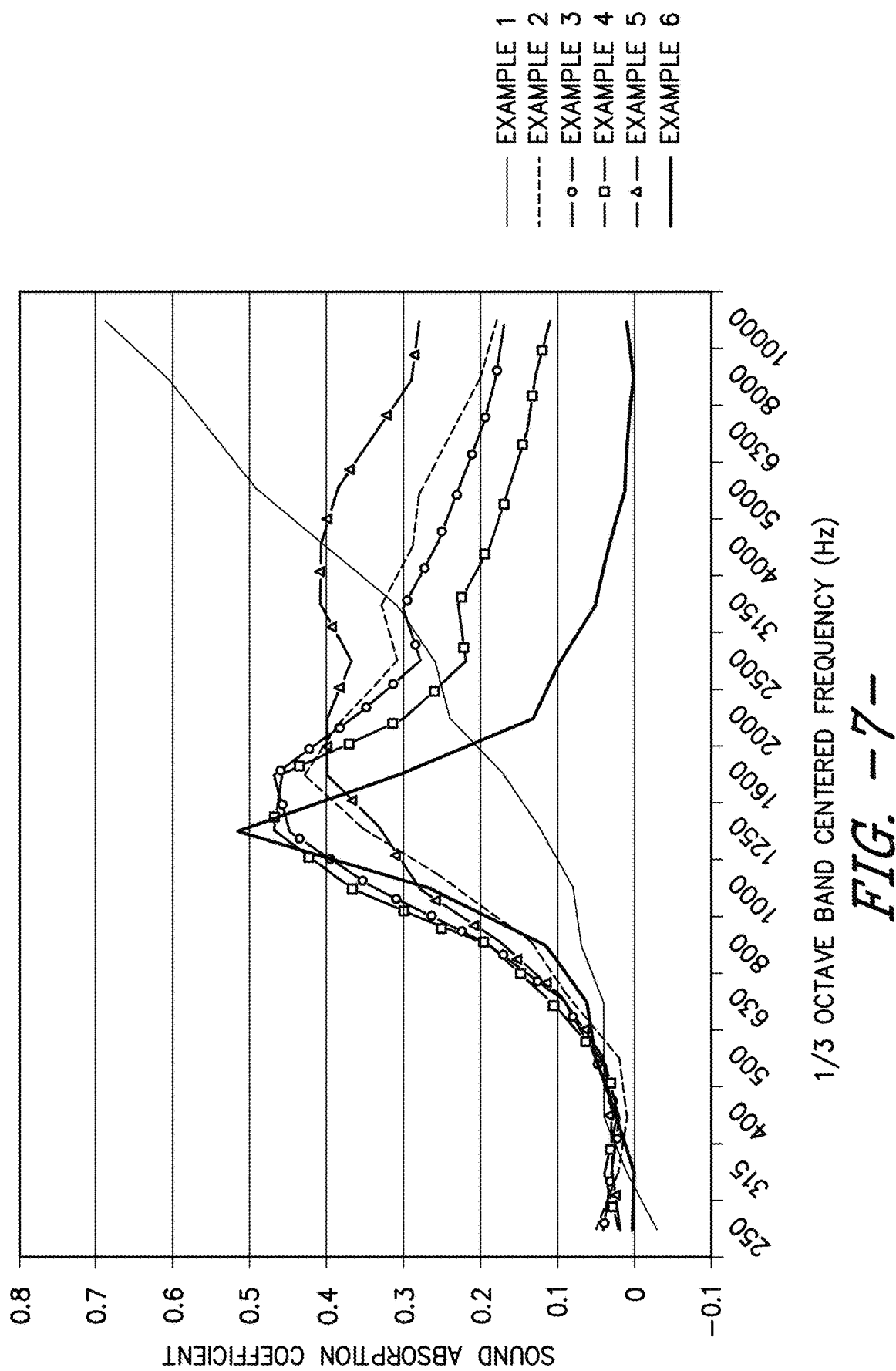

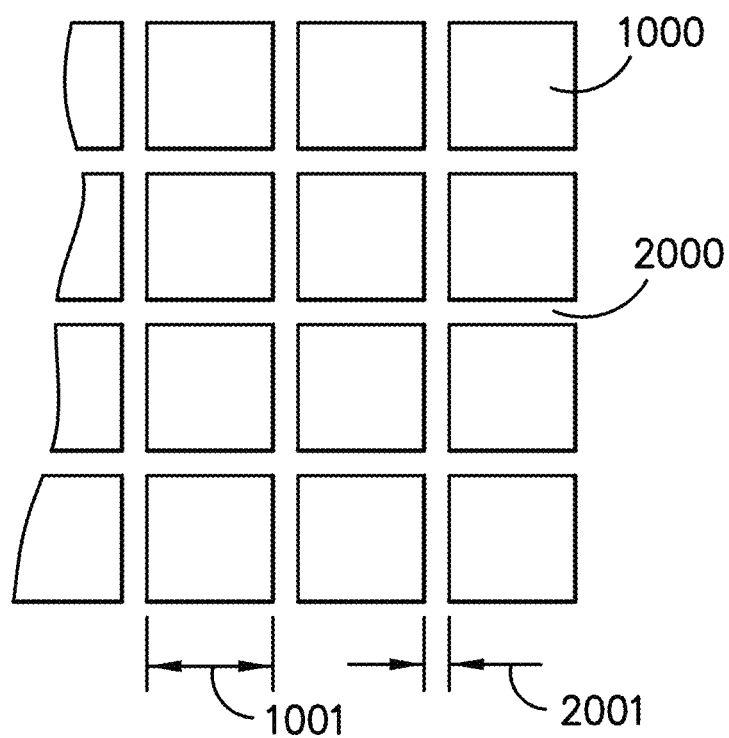
FIG. -7A-
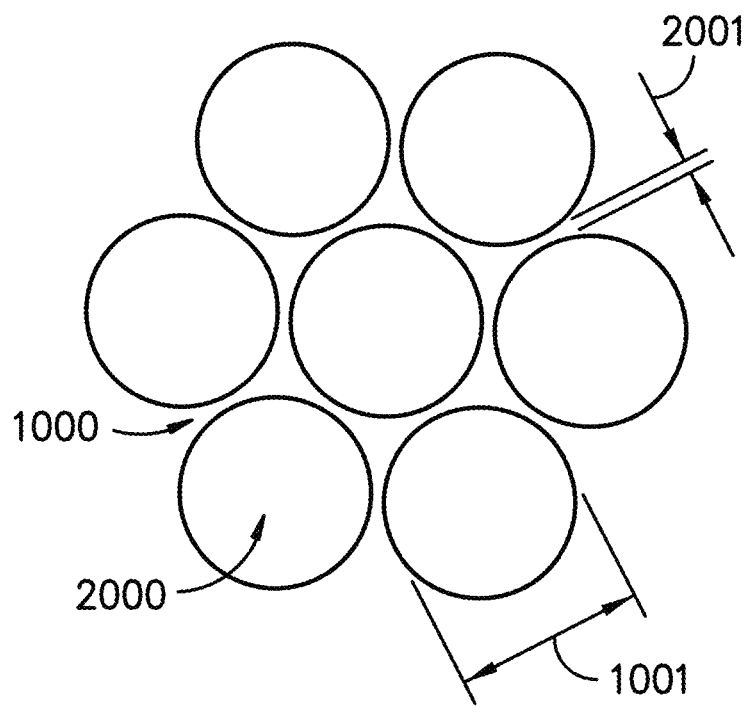
FIG. -7B-

NONWOVEN COMPOSITE

FIELD OF THE INVENTION

The present invention generally relates to composites having sound absorbing properties and methods of making and using such composites.

BACKGROUND

Sound absorbing materials are used in a number of applications within the transportation, building and construction, office and home furnishing, and entertainment industries to enhance user experiences and reduce unwanted noise. Composite materials offer the opportunity to tune the acoustic properties of sound absorbing materials for optimal performance in specific applications while minimizing the overall part mass. In many of these applications it is also required that the material be molded into a specified shape and rigidity. In the automotive industry, these types of moldable acoustic composite materials are often used for applications such as wheel well liners, underbody shields, hood liners, firewall barriers, dash insulators, and flooring among others. In certain automotive applications, these moldable acoustic composite materials may require an aesthetically pleasing cover material be incorporated into the part.

There is a need for moldable acoustic nonwoven composite materials having improved and tailored acoustic properties, while retaining low material and manufacturing costs.

BRIEF SUMMARY

The application relates to a nonwoven composite having an upper surface and a lower surface where the upper surface and the lower surface define a composite thickness. The nonwoven composite contains a plurality of solid regions and a plurality of porous regions. The solid regions have an average size of greater than about 1 mm$^2$, the porous regions have an average size of greater than about 1 mm$^2$, and the porous regions and solid regions form a pattern on the lower surface of the nonwoven composite.

The solid regions contain a solid region nonwoven layer, an optional solid region polymer-fiber infused layer, and a solid region cap layer.

The solid region nonwoven layer has a first side and a second side, where the first side of the solid region nonwoven layer forms a portion of the upper surface of the nonwoven composite. The solid region nonwoven layer contains a plurality of first staple fibers and less than about 5% by volume of a first polymer.

The solid region polymer-fiber infused layer has a first side and a second side, where the solid region polymer-fiber infused layer is oriented such that the first side of the solid region polymer-fiber infused layer is adjacent to the second side of the solid region nonwoven layer. The solid region polymer-fiber infused layer contains a plurality of the first staple fibers and the first polymer.

The solid region cap layer has a first side and a second side and is oriented such that the first side of the solid region cap layer is adjacent to the second side of the solid region polymer-fiber infused layer or the second side of the solid region nonwoven layer. The second side of the solid region cap layer forms a portion of the lower surface of the nonwoven composite. The solid region cap layer contains the first polymer and less than about 5% by volume of the first staple fibers and the average distance between first and second sides of the solid region cap layer is greater than about 65 μm.

The porous regions contain a porous region nonwoven layer and a porous region polymer-fiber infused layer.

The porous region nonwoven layer has a first side and a second side and forms a portion of the upper surface of the nonwoven composite. The porous region nonwoven layer contains a plurality of the first staple fibers and less than about 5% by volume of a first polymer.

The porous region polymer-fiber infused layer has a first side and a second side and is oriented such that the first side of the porous region polymer-fiber infused layer is adjacent to the second side of the porous region nonwoven layer and the second side of the porous region polymer-fiber infused layer forms a portion of the lower surface of the nonwoven composite. The porous region polymer-fiber infused layer contains a plurality of the first staple fibers and at least 15% by volume first polymer. The porous region polymer-fiber infused layer contains a plurality of pores, where the pores provide a continuous path for air to transport from the first side to the second side of the porous region polymer-fiber infused layer.

The application also relates to a process for forming a nonwoven composite. The process contains the step of forming a nonwoven containing a plurality of first fibers and having a first surface and an opposite second surface, where the first surface and the second surface define a nonwoven layer thickness. The process also contains the steps of obtaining at least a first polymer, where the first polymer is a thermoplastic polymer and applying the first polymer (in molten, semi-molten, or solid state) to the second surface of the nonwoven. The process further contains the step of applying pressure and optionally heat to the nonwoven and the at least first polymer, where the first polymer and the second surface of the nonwoven are subjected to a patterned textured surface which embeds a portion of the first fibers from the nonwoven into the first polymer. The first polymer is cooled, forming a nonwoven composite.

BRIEF DESCRIPTION OF THE DRAWINGS

FIG. 1 is an illustrative cross-section of one embodiment of the nonwoven composite.

FIG. 2 is a micrograph of the cross-section of one embodiment of the nonwoven composite focusing on a solid region.

FIG. 3 is a micrograph of the cross-section of one embodiment of the nonwoven composite focusing on a porous region.

FIGS. 4-6 are top-view micrographs of one embodiment of the nonwoven composite at different magnifications.

FIG. 7 is a plot of the sound absorption coefficients of several examples.

FIGS. 7A and 7B are illustrative views looking at the lower surface of the composite.

DETAILED DESCRIPTION

The present disclosure is directed to moldable acoustic composites that provide acoustical properties including, but not limited to, sound absorption properties and sound barrier properties. The nonwoven composite (1) has positive sound absorption properties; (2) has structural features that enable their use in a variety of applications; and (3) can be manufactured in a cost-effective manner.

Referring to FIG. 1, there is shown a cross-sectional illustration of one embodiment of the nonwoven composite 10. The nonwoven composite 10 contains at least 2 types of regions, a solid region 100 and a porous region 200. The nonwoven composite has an upper surface 10a and a lower surface 10b. The distance between these two surfaces 10a, 10b is the nonwoven composite thickness.

The nonwoven composite 10 may contain additional regions besides the solid regions 100 and the porous regions 200 such as transitional regions between the two regions 100, 200. In one embodiment, the nonwoven composite preferably contains a plurality of wall regions located between the solid regions and porous regions which are transitional regions between the solid and porous regions 200. The wall regions may contain physical characteristics of both the solid and porous regions. The solid regions have an average first porosity and the porous regions have a second porosity and preferably the second porosity is at least 1000% greater than the first porosity. Pores are defined as a continuous path for the transport of air through a layer or a region of the nonwoven composite.

Preferably, the solid regions 100 have an average surface area size (when viewed normal to the lower surface 10b of the nonwoven composite) of greater than about 1 $mm^2$, more preferably greater than about 5 $mm^2$, most preferably greater than about 10 $mm^2$. Preferably, the porous regions 200 have an average surface area size (when viewed normal to the lower surface 10b of the nonwoven composite) of greater than about 1 $mm^2$, more preferably greater than about 5 $mm^2$, and most preferably greater than about 10 $mm^2$.

Preferably, the solid regions 100 and/or the porous regions 200 are in a pattern. The pattern may be continuous or discontinuous, regular and repeating or random. Preferably, the pattern is repeating. "Continuous" in this application means that from one edge of the composite to the other edge there is a continuous path of either solid regions 100 or porous regions 200. Some continuous patterns include linear stripes, grids, a rectilinear grid, and wavy lines. "Discontinuous" in this application means that from one edge of the composite to the other edge there is not a path of either solid regions 100 or porous regions 200. Examples of discontinuous patterns include dots, most indicia, text, and short random lines. Preferably, the presence of the solid regions 100 or porous regions 200 on the lower surface 10b of the composite 10 is not visibly evident when looking at the upper surface 10a of the composite 10. In one example of a pattern of the solid regions comprising a series of repeating dots, the solid regions would be in a discontinuous pattern and the porous regions would be in a continuous, repeating pattern (the inverse of the dot pattern).

Referring now to FIGS. 7A and 7B, which are two different illustrations of different patterns of solid regions and porous regions that can be seen on the lower surface of the composite. In these illustrations, the regions 1000 may be solid regions or porous regions (with the regions 2000 being the inverse region). In a preferred embodiment, the regions 1000 are the solid regions and the regions 2000 are the porous regions.

One example, shown in FIG. 7A, shows a pattern of lines forming a grid. The lines are the regions 2000 and the square-like shapes are the regions 1000. The smallest dimension 2001 of the line regions 2000 within pattern is the width of the lines. The smallest dimension 1001 of the square like grid regions 1000 is the width of the square shape.

Another example, shown in FIG. 7B, shows a pattern of repeating dots. The spacing between the dots are the regions 2000 and the dot shapes are the regions 1000. The smallest dimension 2001 is the distance between the dots. The smallest dimension 1001 of the dot regions 1000 is the diameter of the dots.

Preferably, the smallest dimension of the porous regions of the pattern when viewed normal to the lower surface 10b of the nonwoven composite is at least as wide as the solid region cap layer thickness. More preferably, the smallest dimension of the porous regions of the pattern is at least twice the thickness of the solid region cap layer. The smallest dimension of the pattern is preferably greater than 0.1 mm, more preferably greater than 0.2 mm, and most preferably greater than 0.3 mm.

The pattern of solid and porous regions on the lower surface of the nonwoven composite can be seen in photomicrographs in FIGS. 4-6. FIGS. 4-6 are of the same nonwoven composite taken with increasingly high magnification. As one can see in FIG. 4, the porous regions are in a continuous linear design and the solid regions form discontinuous square-like shapes. It is possible to create the inverse of this pattern also, with the solid regions being the continuous linear grid. The pore openings in FIGS. 4-6 are typically smaller than the voids present between the fibers in the uncoated nonwoven because the first polymer bridges and coats the fibers. Three dimensionally, each pore is typically more constrained to air flow since air can no longer spread out as soon as it passes the fiber. Therefore, higher air flow resistance can be achieved.

The porous regions 200 of the composite 10 can range from about 5% to 80% of the total surface area of the lower surface 10b of the composite 10, preferably between about 20% and 60%. In one embodiment, the smallest dimension of the porous regions are at least 3 times as wide as the average spacing between fibers on the lower surface 10b of the composite 10. Preferably, the porous regions 200 are narrower than 3 times the composite 10 thickness, more preferably narrower than 1 times the composite thickness.

The relative surface area of porous regions 200 and solid regions 100 may be tailored to the end use according to the required structural properties, durability properties (resistance to abrasion, chipping, etc.), barrier properties (permeability to air and other fluids including water, oil, etc), surface attachment properties such as ice and dirt, surface release properties, and acoustic properties including sound absorption and sound barrier requirements. In one embodiment, the nonwoven composite 10 comprises about 50% by surface area of porous regions. In another embodiment, the nonwoven composite 10 comprises less than about 30% by surface area of porous regions. In another embodiment, the nonwoven composite 10 comprises less than about 10% by surface area of porous regions.

The process of making the nonwoven composite begins with creating a nonwoven (which will eventually form a portion of layers 110, 120, 210, 220, and to a small extent 130).

The nonwoven may be formed by any suitable method including, but not limited to carding or garnetting, air laying, cross-lapping, needling, structuring, stitching, and bonding. The nonwoven contains a plurality of first staple fibers as well as optional fibers such as binder fibers, additional staple fibers, and other effect fibers (defined as any fiber having an "effect" such as bulking, color, antistatic, etc.).

Preferably, the nonwoven is formed by carding, cross-lapping, and needle-punching, and optionally thermal bonding a plurality of first staple fibers, optional binder fibers, and other staple fibers. The nonwoven preferably has a thickness between about 1 and 25 mm and more preferably a thickness between about 1 and 8 mm. The nonwoven preferably has an areal density of between about 100 and 2000 g/m² and more preferably between about 250 and 1000 g/m². In one embodiment, the nonwoven is substantially and generally uniform in fiber weight percentages, areal weights, and areal densities across the nonwoven (in all three directions). In one embodiment, the first staple fibers comprise about 40% of the total fiber volume in the nonwoven, preferably between 50 and 100% of the total fiber volume in the nonwoven, and more preferably between about 60 and 95% of the total fiber volume in the nonwoven.

In one embodiment, the upper surface 10a of the nonwoven is formed into a random velour. To create the random velour, the nonwoven is passed over a brush apparatus having a series of projections and interstices between the projections. This random velour look is desirable as when used as an A surface (the surface of the composite accessible in the final application) for end uses such as car interiors. Preferably, the random velour has a pile height of at least about 2 millimeters.

The first staple fibers of the nonwoven are fibers that provide mass and volume to the material. The first staple fibers provide volume or bulk or loft in the Z-direction. For the purposes of this application, the Z-direction of the nonwoven is defined as the direction orthogonal to the planar direction of the nonwoven. The planar direction means in a plane parallel to the first and second sides of the nonwoven. The first staple fibers can include virgin and recycled fibers, high crimp fibers, hollow-fill fibers, circular and non-circular cross-section fibers, conjugated fibers, and other common staple fibers or a blend thereof. Some examples of first staple fibers include polyester, polypropylene, nylon, cotton, and wool as well as other staple fibers. In a preferred embodiment, the first staple fibers comprise polyester. Preferably, the first staple fibers have an average denier of approximately 1 to 20, more preferably 1.5 to 12 denier, and most preferably 3 to 9 denier. In one embodiment, the fibers have a circular cross section. In another embodiment, fibers have higher surface area or noncircular cross section such as segmented pie, multi-lobal, winged fibers, tri-lobal, etc. It has been shown that the fiber denier, crimp, and cross-section influence the sound absorption properties of the nonwoven. Optionally, additional staple fibers of different average denier or cross section may be added to improve the mechanical properties of the nonwoven such as tensile strength, tear strength, or compression resistance, or to improve other properties such as acoustic absorption, etc.

In addition to the first staple fibers 400 in the nonwoven, the optional binder fibers of the nonwoven are fibers that adhere to and bond with the other fibers. Binder fibers can include fibers that are heat activated, meaning that all or some portion of the fiber can soften or melt at a lower temperature than the first staple fiber. When activated by heat or other means, the binder fibers create fused bond points or welds between adjacent fibers that create a network of interconnected fibers. The binder fibers are preferably staple fibers. Examples of heat activated binder fibers include low melt fibers and bi-component fibers, where one of the components of the fiber melts at a lower temperature. Example of bicomponent fiber geometries include side-by-side or core and sheath fibers and the like. In one embodiment, the binder fibers are a polyester core-and-sheath fiber with a sheath that melts at a lower temperature than the core. A benefit of using a heat activated binder fiber as the binder fiber in the nonwoven is that the nonwoven composite can be subsequently thermally molded into a three-dimensional shape for use in automotive floors, wheel well liners, under-body shields, hood liners, engine compartment covers, ceiling tiles, office panels, etc. The low melt fiber or portion of the fiber acts as an adhesive that holds the molded part in its final shape after it has been removed from the mold and cooled to room temperature. In some embodiments, in the final product the binder fibers may lose some or all of their fiber shape. Another benefit of binder fibers in the nonwoven is to improve abrasion resistance of the exposed nonwoven.

Preferably, when the nonwoven composite 10 is subjected to an additional heat cycle and then cooled, the binder fibers remain as discernable fibers. In another embodiment, when the nonwoven composite 10 is consolidated, the binder fibers lose their fiber shape and form a coating on surrounding materials. Preferably, the optional binder fibers have an average denier less than or about equal to 15 denier, more preferably less than about 6 denier, and most preferably 4 denier or less.

Any other suitable fiber may also be used in the nonwoven in addition to the first staple fibers 400 and optional binder fibers described previously. These may include, but are not limited to, an additional binder fiber having a different denier, staple length, crimp, cross-sectional shape, composition, or melting point or a bulking fiber having a different denier, staple length, or composition, or a fire resistant or fire retardant fiber. The fiber may also be an effect fiber, providing a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), heat resistance (such as glass or ceramic fibers), fire resistance, or others.

In one embodiment, the nonwoven contains fire resistant fibers. These fire resistant fibers may also act as the bulking fibers or may be used in addition to the bulking fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

Some or all of the fibers (first staple fiber 400, optional binder fibers, additional fibers) may additionally contain additives within the fibers or as topical coatings or fiber finishes. Suitable additives include, but are not limited to, fillers, stabilizers, plasticizers, tackifiers, hydrophobic agents, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

The network of fibers in the nonwoven interact through entanglement and bonding to provide integrity, strength, and resiliency when the lofty nonwoven is exposed to forces. In the planar direction of the lofty nonwoven, the degree of entanglement and bonding can be measured by the tensile properties of the nonwoven layer.

Another characteristic of the nonwoven is the tendency for the material to deform in the Z-direction when a compression force is applied and recover its original shape after the compression force is removed. Preferably, the volumetric porosity of at least a portion of the nonwoven is greater than about 25%, more preferably greater than about 50%. The volumetric porosity is defined as the volume percentage of the nonwoven occupied by air (or other gas). These levels of porosity in lofty nonwovens will enable Z-direction compression and recovery properties well suited for many applications such as floor underlayment, carpet padding, and furnishings. Different nonwovens with different combinations of non-uniform fiber orientations, fiber contact points, discrete bond points, and bulk densities results in materials that exhibit different levels of compression and recovery behavior when exposed to Z-direction compression forces. For example, a loosely connected network of low stiffness or small diameter fiber may have a very low compression resistance and compression recovery while a more densely connected network of stiff fibers may offer higher compression resistance and recovery. These compression and recovery properties may play a critical role in how the material behaves when exposed to further processing steps such as coating, lamination, heating and molding.

The nonwoven may also be formed with a non-uniform distribution of fiber types through the nonwoven thickness. One embodiment is a stratified nonwoven with one side containing primarily large denier fibers and a second side containing primarily small denier fibers. Another embodiment is a structured nonwoven with a first face side and a second back side. In this embodiment, the face side is characterized by loops or fiber tufts wherein the fiber axis is generally oriented about in the Z-direction while the back side contains similar or dissimilar fibers where the general orientation is approximately in the planar direction of the nonwoven. An example of one such embodiment would be the nonwoven carpets commonly used in automotive floors which often comprise a face and a back side.

After the nonwoven is formed, a first polymer is obtained that will be used to form parts of the upper areas within the composite 10. The first polymer may be any suitable thermoplastic polymer such as one that has a softening point or melting point near or sufficiently below the melting or softening point of the polymer used to make the first staple fibers in the nonwoven so that the first staple fibers in the nonwoven do not melt or shrink excessively when the first polymer is applied to it through heat and/or pressure or when the part is optionally heated to soften the first polymer, as often occurs when molding the nonwoven composite. In one embodiment, for a nonwoven of predominately polyethylene terephthalate (polyester or PET) first stable fibers, low density polyethylene (LDPE) is a suitable choice for the first polymer. The first polymer can include but is not limited to polyethylene, polypropylene, polybutylene, polyvinyl chloride, poly (ethylene-co-vinyl acetate), nylon, polyethylene terephthalate, and polybutylene terephthalate. Also suitable for the first polymer would be the general class of thermoplastic elastomers, thermoplastic vulcanizates, thermoplastic polyurethanes, and copolymers or blends of any thermoplastic polymer with additional polymers, processing aids, viscosity modifiers, fillers, density modifying agents, blowing agents, IR active materials, adhesion modifiers, stabilizers or other additives.

To form the nonwoven composite 10, the first polymer is applied to the nonwoven in the molten, semi-molten, or solid state. The process further contains the step of applying pressure and optionally heat to the nonwoven and the first polymer (or polymer blend), where the first polymer (or blend) and the second surface of the nonwoven are subjected to a patterned textured surface which embeds a portion of the first fibers from the nonwoven into the first polymer, thereby bonding them together. The high points of the textured surface correspond to the porous regions (which are formed in a subsequent operation) in the nonwoven composite, while the low points of the textured surface correspond to the solid regions of the nonwoven composite. Therefore, the patterned textured surface has an inverse profile from the desired pattern of the porous and solid regions of the nonwoven composite.

Application of the pressure and optionally heat occurs as the first polymer is being applied to the nonwoven or after the first polymer is applied. The nonwoven composite 10 is then cooled such that the first polymer at least partially solidifies. This cooling preferably happens while the first polymer is in contact with the patterned textured surface as to preserve the texture in the composite 10. In one embodiment, the application of first polymer and subjecting the first polymer and nonwoven to pressure (and optionally heat) takes place approximately simultaneously. In another embodiment, the application of first polymer and subjecting the first polymer and nonwoven to pressure (and optionally heat), and then cooling the composite takes place approximately simultaneously.

One preferred method of applying the first polymer to the nonwoven and subjecting the combination to the patterned textured surface is by bringing the nonwoven into a nip which contains a patterned roller having a textured surface and a pressure roller, and extruding molten first polymer either onto the nonwoven before it enters the nip, onto the nonwoven right at the nip, or onto the patterned textured roller close to the nip. The patterned textured roller creates the plurality of porous regions and the plurality of solid regions. Typically, the textured roller would be chilled (by cooling water or the like) such that the first polymer at least partially solidifies into the inverse of the textured surface of the roller before the now composite nonwoven 10 leaves the nip.

In another embodiment, the at least first polymer is applied to the nonwoven as a free standing, solid film. This film may be placed on the nonwoven and then heat and pressure are applied via a patterned textured surface such that the film is at least partially melted and conforms to the textured surface. The composite is then cooled preferably while the film is in contact with the textured surface as to preserve the texture in the composite 10.

The step of using pressure (and optionally heat) while subjecting the first polymer to the patterned textured surface creates regions in the material that lead to the plurality of solid regions 100 and plurality of porous regions 200 in the composite 10. The solid regions 100 are identified by the planar-like portions of the composite surface 10*b* corresponding to the areas of maximum nonwoven composite thickness. The porous regions are identified by the planar-like portions of the composite surface 10*b* where the nonwoven composite thickness is reduced. The measured difference in nonwoven composite thickness between the solid and porous regions is referred to as the indentation depth.

Once the nonwoven composite 10 is formed, it may be treated to an additional step(s) of adding heat and optionally pressure. The temperature of the heat exposure can be chosen so that it exceeds the relaxation temperature of the nonwoven and the softening or melting point of the first polymer but is below the softening or melting point of the first staple fiber. As a result of this additional exposure to heat, the porous regions 200 develop porosity. While not being bound to any theory, it believed that while the first polymer and nonwoven are being subjected to pressure (and optionally heat) to form the nonwoven composite 10, a portion of the first polymer infuses into the nonwoven, encapsulating some fibers and compressing the nonwoven. In addition, during this process a portion of the first polymer is moved from the areas that will become the porous regions to the areas that will become the solid regions due to the pattern on the roller. The additional step(s) of adding heat softens or melts the first polymer and may enable the compressed areas of the nonwoven layer to relax and spring back. The forces that drive the relaxation and spring back behavior of the nonwoven layer include residual mechanical stresses, residual thermal stresses, and polymer shrinkage. The relative motion among the fibers in the nonwoven layer as it relaxes and springs back exert a shearing action on the softened or molten first polymer locally between and among the encapsulated fibers. The shearing action exerted on the first polymer by the encapsulated fibers is sufficient to open pores through the thickness of the porous region polymer-fiber infused layer 220 but not through the solid region cap layer 130.

The solid regions 100 comprise a solid region nonwoven layer 110, an optional solid region polymer-fiber infused layer 120, and a solid region cap layer 130. The layers are characterized by their composition and may not have distinct boundaries. A photomicrograph of the cross-section of one solid region can be seen in FIG. 2. In the solid regions 100, there is essentially no porosity due to the cap layer. In one preferred embodiment, the solid regions do contain a solid region polymer-fiber infused layer 120, but typically the solid region polymer-fiber infused layer 120 is much thinner than the solid region cap layer 130 and the solid region nonwoven layer 110.

The solid region nonwoven layer 110 has a first side 110a and a second side 110b. The first side 110a of the solid region nonwoven layer 110 forms a portion of the upper surface 10a of the nonwoven composite 10. The solid region nonwoven layer 110 is mostly the nonwoven with little to no first polymer. Preferably, the solid region nonwoven layer 110 comprises less than about 5% by volume of the first polymer 300. The volume percentage of a component is measured by taking a cross-sectional image of the nonwoven composite and measuring the surface area on that cross-section. The percentage of area taken up by a component in the cross-sectional image is considered to be equivalent to the volume percentage of that component in the vicinity of the area surveyed.

The solid region cap layer 130 has a first side 130a and a second side 130b. The solid region cap layer 130 is oriented such that the first side 130a of the solid region cap layer 130 is adjacent second side 120b of the solid region polymer-fiber infused layer 120 or the second side of the solid region nonwoven layer 110b, and the second side 130b of the solid region cap layer forms a portion of the lower surface 10b of the nonwoven composite 10. The solid region cap layer 130 comprises the first polymer 300 and less than about 5% by volume of the first staple fibers, optional binder fibers, and other fibers of the nonwoven. Preferably, the solid region cap layer 130 comprises the first polymer 300 and less than about 5% by volume fibers (all fibers). Preferably, the solid region cap layers 130 comprise essentially no pores 221. Preferably, the average distance between first and second sides, 130a and 130b, of the solid region cap layer 130 is greater than about 65 µm. Preferably, the solid region cap layer 130 comprises essentially no fibers from the nonwoven layer.

Located between the solid region nonwoven layer 110 and the solid region cap layer 130 is an optional solid region polymer-fiber infused layer 120. This polymer-fiber infused layer 120 is a transitional region which has some of the characteristics of both the nonwoven layer 110 and the cap layer 130. The solid region polymer-fiber infused layer 120 is oriented such that the first side 120a of the solid region polymer-fiber infused layer 120 is adjacent to the second side 110b of the solid region nonwoven layer 110 and that the second side 120b of the solid region polymer-fiber infused layer 120 is adjacent to the first side 130a of the solid region cap layer 130. The solid region polymer-fiber infused layer 120 comprises a plurality of the first staple fibers 400, optional binder and other fibers, and the first polymer 300 and at least a portion of the first staple fibers 400 are embedded into the first polymer 300. Physical intermingling of first staple fibers 400 and first polymer 300 ensures strong adhesion between the layers. As a transitional region, the solid region polymer-fiber infused layer 120 tends to be thinner (defined as the distance between the first and second sides 120a, 120b) than the solid region cap layer 130 or the solid-region nonwoven layer 110.

The porous regions 200 comprise a porous region nonwoven layer 210 and a porous region polymer-fiber infused layer 220. The layers are characterized by their composition and may not have distinct boundaries. A photomicrograph of the cross-section of one porous region can be seen in FIG. 3.

The porous region nonwoven layer 210 is essentially the same as the solid region nonwoven layer 110 and both are formed from the same nonwoven layer used to make the composite 10. The porous region nonwoven layer 210 has a first side 210a and a second side 210b, where the first side 210a of the porous region nonwoven layer 200 forms a portion of the upper surface 10a of the nonwoven composite 10. The porous region nonwoven layer 210 comprises a plurality of first staple fibers 400, optional binder fibers and other fibers and less than about 5% by volume of first polymer 300.

The porous region 200 also contains the porous region polymer-fiber infused layer 220 which has a first side 220a and a second side 220b, where the porous region polymer-fiber infused layer 220 is oriented such that the first side 220a of the porous region polymer-fiber infused layer 200 is adjacent the second side 210b of the porous region nonwoven layer 210 and the second side 220b of the porous region polymer-fiber infused layer forms a portion of the lower surface 10b of the nonwoven composite 10. The porous region polymer-fiber infused layer 220 comprises a plurality of the first staple fibers 400 and the first polymer 300. The porous region polymer-fiber infused layer 220 is formed when the first polymer is applied with pressure and optionally heat to the nonwoven such that the first polymer infuses into a portion of the nonwoven.

The porous region polymer-fiber infused layer 220 comprises a plurality of pores 221, the pores being defined as having a continuous path for air to move from the first side

220a to the second side 220b of the porous region polymer-fiber infused layer 220. These pores 221 enable the porous regions 200 to be porous. The pores may be in the porous region polymer-fiber infused layer 220 directly after the heat and pressure step, or may form during or after subsequent heating cycles. The first polymer in the porous region polymer-fiber infused layer 220 forms a coating between and spanning across the fibers, which reduces the pore size and volumetric porosity of the layer relative to the original uncoated nonwoven. The nature of the porosity in the porous region polymer-fiber infused layer 220, due to the infused first polymer, is therefore different than in the uncoated nonwoven. In contrast, a mechanically perforated film attached to a nonwoven does not provide reduced pore size in the porous areas, where the porosity is the same as that of the underlying nonwoven.

The pores 221 are typically smaller than 0.5 mm along their largest dimension measured within the plane of the composite 10 (width or diameter), more preferably smaller than 0.2 mm. In one embodiment, the number average pore size is under 0.06 mm and half of the pore area is provided by pores with less than 0.12 mm diameter. The average pore size is related to the average distance between fibers in the nonwoven and the degree of relative motion that occurs between encapsulated fibers during the heating step(s). Pores 221 with dimensions on this scale are known to provide excellent sound absorption due to their ability to dissipate sound energy in a viscous boundary layer as the sound pressure waves move air through the pores. Pores of these dimensions may be difficult to form through common means such as mechanical perforation. Since the pore size and shape is influenced and partially controlled by the inter-fiber spacing in the nonwoven, the pores remain relatively small and stable when exposed to excess heat. In contrast, holes in conventional mechanically perforated films tend to close or grow rapidly when exposed to heat above the film's softening temperature.

Preferably, the porous region polymer-fiber infused layer 220 contains between about 15 and 85% by volume first staple fibers, about 15 and 85% by volume first polymer, and about 5 and 50% by volume air. More preferably between about 20 and 60% by volume first staple fibers, about 40 and 80% by volume first polymer, and about 5 and 20% by volume air. Considering just the solid parts of the porous region polymer-fiber infused layer 220 (excluding any air filled open spaces within the layer), the solid parts of the layer preferably include between about 15 and 85% by volume first staple fibers and between about 15 and 85% by volume first polymer, more preferably between about 20 and 60% by volume first staple fibers and between about 40 and 80% by volume first polymer. In one embodiment the volume ratio between all of the polymer and all of the fibers within the layer is between about 50:50 and 80:20.

In one embodiment, the volume fraction of total fibers in the in the porous region polymer-fiber infused layer 220 is preferably less than about 70% by volume, more preferably less than about 50% by volume, more preferably less than about 30% by volume.

A patterned surface of solid and porous regions (100, 200), where the porous regions 200 have a greater porosity than the solid regions 100, has numerous benefits. The solid film nature of the cap layer of the solid regions provides enhanced structural properties, durability properties (resistance to abrasion, chipping, etc.), barrier properties (impermeability to air and other fluids including water, oil, etc) and surface detachment properties from materials such as ice and dirt. The cap layer of the solid regions provides an accessible area for bonding of additional layers to the composite without disturbing the porosity created in the porous regions of the composite and the cap layer of the solid regions, when heated, can act as the adhesive material. In terms of acoustic performance, the solid regions act primarily as barrier regions while the porous regions are highly sound absorbing. The combination of solid and porous regions also enables a more drapable composite that can be molded with fewer wrinkles.

In one embodiment, an additional nonwoven layer is attached to the composite (preferably on the lower surface of the composite 10). This additional nonwoven layer preferably has a thickness greater than the thickness of the composite 10. This additional nonwoven layer is sometimes referred to in the automotive industry as a sound absorbing or shoddy layer. The sound absorbing layer can be added to a composite to provide additional acoustic absorption, barrier properties, or vibrational damping properties to the total system, leading to better overall performance. The additional nonwoven layer can be attached by any suitable means such as adhesive or fasteners. In a different embodiment, the shoddy can serve as the nonwoven layer which forms a portion of the composite 10.

The nonwoven composite 10 may also contain any additional layers for physical or aesthetic purposes. Suitable additional layers include, but are not limited to, nonwoven fabrics, woven fabrics, tufted fabrics, knitted fabrics, foam layers, films, paper, adhesive-backed layers, foils, meshes, elastic fabrics (i.e., any of the above-described woven, knitted or nonwoven fabrics having elastic properties), apertured webs, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation or acoustic performance (such as a melt-blown web or a fiberglass fabric); layers of particles; decorative fabric layers; membranes (i.e., films with controlled permeability, such as dialysis membranes, reverse osmosis membranes, etc.); netting; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the nonwoven composite. For example, a textile may be applied to one side of the nonwoven composite using an optional adhesive layer to form an aesthetic surface for an end use such as certain automobile applications.

In another embodiment, the nonwoven composite 10 is molded into a three dimensional shape for use as a durable exterior vehicle part where the lower surface of the composite 10 faces away from the vehicle. Additional nonwoven layers may be attached to the composite 10, preferably to the upper surface of the molded composite. These additional nonwovens layers can be added to a composite to provide additional acoustic absorption, barrier properties, or vibrational damping properties to the total system, leading to better overall performance. The additional nonwoven layers can be attached by any suitable means such as adhesive or fasteners.

The nonwoven composite 10 may further comprise one or more attachment devices to enable the composite 10 to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite 10 to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

Test Methods

The air permeability of the nonwoven composite 10 can be measured by ASTM D737. The standard calls for clamping a material sample to the test machine with a minimum force of 50 N and adjusting the airflow rate perpendicularly through the sample until a prescribed pressured differential is established. Once steady state is reached, the observed airflow rate at the prescribed pressure differential is used to determine the air permeability of the material. The test standard allows for a range of pressures to be used between 100 and 2500 Pa, but recommends use of 125 Pa unless otherwise specified. Therefore, air permeability of nonwovens composites is reported herein at 125 Pa with the upper surface of the composite in contact with the orifice of the air permeability tester.

US patent application 20040038046 details a testing device for measurement of the load required for sliding movement of ice and for examination of the condition of the ice sliding movement on solid surfaces. A modified version of this test method is used here to measure the normal force required to detach ice from non-woven substrates. The sample size used is 150 mm×80 mm. A circular metal cylinder is placed on top of the sample. The cylindrical fixture has a circular hook welded to the surface of the cylinder. Water is poured into the cylindrical fixture and kept in a freezer at −15° C. for 150 minutes. To prevent breaking/cracking of ice due to expansion, the water needs to be iced gradually. At the end of 150 minutes, a force gage is attached to the hook and the normal force required to remove the fixture from the surface of the non-woven is measured. The appearance of the sample immediately after ice detachment is recorded (any fiber separation or delamination).

The acoustic performance of the examples was evaluated by measuring the sound absorption coefficient using random incident sound absorption testing based on the SAE J2883 test standard. The chamber used for measuring was a 25.0 m³ reverberation room. Guidance as to the aspect ratio of the length to width to height for the room was provided in ISO 3741. Samples were mounted to the floor, using 1.0 by 1.2 m size panels with the upper surface in contact with the floor.

EXAMPLES

Example 1

The nonwoven of example 1 was formed by carding, cross-lapping, needle-punching, and thermally bonding a plurality of first staple fibers with other fibers. The first staple fibers, 6 denier PET, comprised 57% of the total fiber volume in the nonwoven, while 4 denier core/sheath PET binder fibers comprised 29% of the total fiber volume in the nonwoven and 8 denier polypropylene fibers comprised 14% of the total fiber volume. The nonwoven had a thickness between about 3 and 4 mm and an areal density of about 700 g/m².

Example 2

The nonwoven of example 1 was coated with 300 g/m² of 12 melt flow rate (MFR) low density polyethylene (LDPE) using a standard extrusion lamination process. The nonwoven was roll fed into a nip formed by a patterned textured chill roller and a pressure roller such that the lower side of the nonwoven faced the textured chill roller and the upper side faced the pressure roller. Molten LDPE was applied to the lower side of the nonwoven at the nip. The chill roll was patterned with a raised grid design, where the high points of the textured surface were continuous and linear, and the low points were square-like and discontinuous. The squares were approximately 4 mm on each side and the grid lines were approximately 1 mm in width and 1 mm in depth. An inverse texture of the chill roll was imparted to the lower side of the nonwoven, meaning that the raised grid of the patterned nip resulted in a nonwoven composite with raised 4-mm squares and a recessed 1-mm wide grid pattern. The recessed grid of the nonwoven composite corresponds to the formation of the porous regions 200, while the raised squares correspond to the formation of solid regions 100. In the solid regions 100, the solid region cap layer 130 had an average thickness of about 0.3 mm.

The nonwoven composite of Example 2 was heated by an infrared heater to a surface temperature of approximately 350° F. while constrained by a frame around all 4 sides, then cooled to near room temperature before removing from the frame. After the heating and cooling, the nonwoven composite exhibited a plurality of micropores in the porous regions and the porosity in the solid regions was essentially zero, meaning no pores were found in the solid regions over the area surveyed. After heating, the solid regions look substantially unchanged from the unheated Example 2, that is, the cap layer porosity remains essentially zero. The average film thickness in the solid regions remained 0.3 mm.

Example 3

The nonwoven composite of example 1 was coated with 300 g/m² of 12 melt flow rate (MFR) low density polyethylene (LDPE) using a standard extrusion lamination process. The nonwoven was roll fed into a nip formed by a textured chill roller and a pressure roller such that the lower side of the nonwoven faced the textured chill roller and the upper side faced the pressure roller. Molten LDPE was applied to the lower side of the nonwoven at the nip. The chill roll was patterned with a raised grid design different from Example 2, where the high points of the textured surface were continuous and linear, and the low points were square-like and discontinuous. The pattern was a mixture of 4 mm and 9 mm squares and the grid was approximately 1 mm in width and 1 mm in depth. An inverse texture of the chill roll was imparted to the lower side of the nonwoven, meaning that the raised grid of the patterned nip resulted in a nonwoven composite with 4- and 9-mm raised squares and a 1-mm wide recessed grid pattern. The recessed grid of the nonwoven composite corresponds to the formation of the porous regions 200, while the raised squares correspond to the formation of solid regions 100. In the solid regions 100, the solid region cap layer 130 had an average thickness of about 0.3 mm.

The nonwoven composite of Example 3 was heated by an infrared heater to a surface temperature of approximately 350° F. while constrained by a frame around all 4 sides, then cooled to near room temperature before removing from the frame. After the heating and cooling, the nonwoven composite exhibited a plurality of micropores in the porous regions, and the porosity in the solid regions was essentially zero, meaning no pores were found in the solid regions over the area surveyed. After heating, the solid regions look substantially unchanged from the unheated Example 3, that is, the cap layer porosity remains essentially zero. The average film thickness in the solid regions remained 0.3 mm.

Example 4

The nonwoven composite of example 1 was coated with 300 g/m² of 12 melt flow rate (MFR) low density polyethylene (LDPE) using a standard extrusion lamination process. The nonwoven was roll fed into a nip formed by a textured chill roller and a pressure roller such that the lower side of the nonwoven faced the textured chill roller and the upper side faced the pressure roller. Molten LDPE was applied to the lower side of the nonwoven at the nip. The chill roll was patterned with a third raised grid design, where the high points of the textured surface were continuous and linear, and the low points were square-like and discontinuous. The squares were approximately 9 mm on each side and the grid was approximately 1 mm in width and 1 mm in depth. An inverse texture of the chill roll was imparted to the lower side of the nonwoven, meaning that the raised grid of the patterned nip resulted in a nonwoven composite with 9-mm raised squares and a 1-mm wide recessed grid pattern. The recessed grid of the nonwoven composite corresponds to the formation of the porous regions 200, while the raised squares correspond to the formation of solid regions 130. In the solid regions 100, the solid region cap layer 130 had an average thickness of about 0.3 mm.

The nonwoven composite of Example 4 was heated by an infrared heater to a surface temperature of approximately 350° F. while constrained by a frame around all 4 sides, then cooled to near room temperature before removing from the frame. After the heating and cooling, the nonwoven composite exhibited a plurality of micropores in the porous regions, and the porosity in the solid regions was essentially zero, meaning no pores were found in the solid regions over the area surveyed. After heating, the solid regions look substantially unchanged from the unheated Example 4, that is, the cap layer porosity remains essentially zero. The average film thickness in the solid regions remained 0.3 mm.

Example 5

The nonwoven of example 1 was coated with 300 g/m2 of 12 melt flow rate (MFR) low density polyethylene (LDPE) using a standard extrusion lamination process. The nonwoven was roll fed into a nip formed by a textured chill roller and a pressure roller such that the lower side of the nonwoven faced the textured chill roller and the upper side faced the pressure roller. Molten LDPE was applied to the lower side of the nonwoven at the nip. The chill roll was patterned with a raised stripes design, where the high points of the textured surface were continuous and linear, and the low points were also continuous and linear. The stripes were 2.2 mm wide with a spacing of 3.2 mm and a depth of 1.4 mm. An inverse texture of the chill roll was imparted to the lower side of the nonwoven, meaning that the raised stripes of the patterned nip resulted in a nonwoven composite with recessed stripes. The recessed stripes of the nonwoven composite correspond to the formation of the porous regions 200, while the raised stripes correspond to the formation of solid regions 130. In the solid regions 100, the solid region cap layer 130 had an average thickness of about 0.3 mm.

The nonwoven composite of Example 5 was heated by an infrared heater to a surface temperature of approximately 350° F. while constrained by a frame around all 4 sides, then cooled to near room temperature before removing from the frame. After the heating and cooling, the nonwoven composite exhibited a plurality of micropores, and the porosity in the solid regions was essentially zero, meaning no pores were found in the solid regions over the area surveyed. After heating, the solid regions look substantially unchanged from the unheated Example 5, that is, the cap layer porosity remains essentially zero. The average film thickness in the solid regions remained 0.3 mm.

Example 6

The nonwoven composite of example 1 was coated with 300 g/m² of 12 melt flow rate (MFR) low density polyethylene (LDPE) using a standard extrusion lamination process. The nonwoven was roll fed into a nip formed by a chill roller and a pressure roller such that the lower side of the nonwoven faced the chill roller and the upper side faced the pressure roller. Molten LDPE was applied to the lower side of the nonwoven at the nip. The chill roll was not patterned, which resulted in a smooth coating with no pattern of solid and porous regions.

The sound absorption coefficients of examples 1-6 are reported in FIG. 7. Example 1, which is an uncoated nonwoven, consists of only porous regions and as such exhibits an almost purely absorptive acoustic behavior. Example 6, which is a coated nonwoven that has essentially no porosity, gives a typical resonant absorber absorption response; that is, has high absorption centered around a narrow frequency band but little-to-no absorption at higher frequencies. Examples 2-5, which contain both solid regions and pores in the porous regions, provide superior absorption over a wide range of frequencies over materials that have essentially only solid or only porous regions. Further, changing the pattern to tailor the porous area allows for control of the resonant frequency and the high frequency absorption.

TABLE 1

| Example | Ice Detach Force (N) | Air Permeability (cm³/s)/cm² |
|---|---|---|
| 1 | 28.2 | 36 |
| 2 | 7.0 | 3.3 |
| 3 | 3.3 | 1.8 |
| 4 | 4.5 | 1.4 |
| 5 | 4.2 | 2.4 |
| 6 | 0.25 | <0.1 |

Table 1 describes the ice detach force for examples 1 through 6. As can be seen in the table, the presence of solid regions lowers the force required to detach ice. In general, the greater the percentage of solid region present in the nonwoven composite, the lower the force required to detach ice from the lower surface of the nonwoven composite. Table 1 also lists the air permeability of the example nonwoven composites. The air permeability of the nonwoven of Example 1 is the highest. Air permeability of the nonwoven composites (Examples 2-5) is reduced relative to the nonwoven itself by the presence of solid regions. Example 6 exhibited no measurable air permeability (<0.1 cm/s).

In summary, Examples 2-5 exhibited superior sound absorption to either single layer nonwovens (such as Example 1) or nonwovens coated with a solid layer (Example 6). Their air permeability was lower than from typical mechanical perforation and stable in value for a window of heat treatments. Ice detach force was significantly lower than the uncoated nonwoven. Air permeability and ice detach force constitute a trade-off that can be tuned via the embossing pattern and process conditions to match the application.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nonwoven composite having an upper surface and a lower surface, the upper surface and the lower surface further defining a composite thickness, wherein the nonwoven composite comprises a plurality of solid regions and a plurality of porous regions, wherein the solid regions have an average surface area size of greater than about 1 mm$^2$, wherein the porous regions have an average surface area size of greater than about 1 mm$^2$, wherein the porous regions and solid regions form a pattern on the lower surface of the nonwoven composite, wherein the solid regions comprise a solid region nonwoven layer, an optional solid region polymer-fiber infused layer, and a solid region cap layer, wherein the solid region nonwoven layer has a first side and a second side, wherein the first side of the solid region nonwoven layer forms a portion of the upper surface of the nonwoven composite, wherein the solid region nonwoven layer comprises a plurality of first staple fibers and less than about 5% by volume of a first polymer, wherein the solid region polymer-fiber infused layer has a first side and a second side, wherein the solid region polymer-fiber infused layer is oriented such that the first side of the solid region polymer-fiber infused layer is adjacent the second side of the solid region nonwoven layer, wherein the solid region polymer-fiber infused layer comprises a plurality of the first staple fibers and the first polymer, wherein the solid region cap layer has a first side and a second side, wherein the solid region cap layer is oriented such that the first side of the solid region cap layer is adjacent the second side of the solid region polymer-fiber infused layer, wherein the second side of the solid region cap layer forms a portion of the lower surface of the nonwoven composite, wherein the solid region cap layer comprises the first polymer and less than about 5% by volume of the first staple fibers, the solid region cap layer comprising essentially no pores, wherein the average distance between first and second sides of the solid region cap layer is greater than about 65 μm, wherein the porous regions comprise a porous region nonwoven layer and a porous region polymer-fiber infused layer, wherein the porous region nonwoven layer has a first side and a second side, wherein the first side of the porous region nonwoven layer forms a portion of the upper surface of the nonwoven composite, wherein the porous region nonwoven layer comprises a plurality of the first staple fibers and less than about 5% by volume of a first polymer, wherein the porous region polymer-fiber infused layer has a first side and a second side, wherein the porous region polymer-fiber infused layer is oriented such that the first side of the porous region polymer-fiber infused layer is adjacent to the second side of the porous region nonwoven layer and the second side of the porous region polymer-fiber infused layer forms a portion of the lower surface of the nonwoven composite, wherein the porous region polymer-fiber infused layer comprises a plurality of the first staple fibers and the first polymer, wherein the porous region polymer-fiber infused layer comprises between about 15 and 85% by volume first polymer, wherein the porous region polymer-fiber infused layer comprises a plurality of pores, and wherein the pores comprise a continuous path from the first side to the second side of the porous region polymer-fiber infused layer.

2. The nonwoven composite of claim 1, wherein the solid regions and porous regions are present as a rectilinear grid.

3. The nonwoven composite of claim 1, wherein the nonwoven composite further comprises a plurality of wall regions located between the solid regions and porous regions.

4. The nonwoven composite of claim 1, wherein the solid region cap layer comprises essentially no first staple fibers from the solid region nonwoven layer.

5. The nonwoven composite of claim 1, wherein solid regions have an average first porosity and the porous regions have a second porosity and wherein the second porosity is at least 1000% greater than the first porosity.

6. The nonwoven composite of claim 1, wherein the solid and porous regions form at least 80% by area of the lower surface of the nonwoven composite.

7. The nonwoven composite of claim 1, wherein the solid regions comprise a solid region polymer-fiber infused layer.

8. The nonwoven composite of claim 1, wherein the solid regions comprise between about 20 and 95% of the surface area of the lower surface of the nonwoven composite.

\* \* \* \* \*